(12) United States Patent
Kai et al.

(10) Patent No.: US 12,417,873 B2
(45) Date of Patent: Sep. 16, 2025

(54) WELDING TRANSFORMER

(71) Applicant: KOYO GIKEN Inc., Kanagawa (JP)

(72) Inventors: Kouji Kai, Kanagawa (JP); Kazuki Houzan, Kanagawa (JP); Tuyosi Shinozaki, Kanagawa (JP); Mitoshi Kai, Kanagawa (JP)

(73) Assignee: KOYO GIKEN INC., Kanagawa (JP)

( * ) Notice: Subject to any disclaimer, the term of this patent is extended or adjusted under 35 U.S.C. 154(b) by 85 days.

(21) Appl. No.: 15/733,924

(22) PCT Filed: Mar. 24, 2020

(86) PCT No.: PCT/JP2020/013131
§ 371 (c)(1),
(2) Date: Dec. 1, 2020

(87) PCT Pub. No.: WO2021/111651
PCT Pub. Date: Jun. 10, 2021

(65) Prior Publication Data
US 2022/0293325 A1    Sep. 15, 2022

(30) Foreign Application Priority Data

Dec. 3, 2019  (JP) .................................. 2019-218705

(51) Int. Cl.
*H01F 27/10* (2006.01)
*B23K 11/24* (2006.01)
(Continued)

(52) U.S. Cl.
CPC ............. *H01F 27/10* (2013.01); *B23K 11/241* (2013.01); *F28F 3/048* (2013.01); *H01F 38/085* (2013.01)

(58) Field of Classification Search
CPC ........ H01F 27/10; H01F 38/085; H01F 27/08; H01F 2027/408; H01F 27/38; H01F 30/10; B23K 11/241; F28F 3/048
See application file for complete search history.

(56) References Cited

U.S. PATENT DOCUMENTS

| | | | |
|---|---|---|---|
| 9,202,622 B2 * | 12/2015 | Kai ..................... | B23K 11/241 |
| 10,381,148 B2 * | 8/2019 | Chida .................... | H01F 27/22 |
| 2010/0156585 A1 | 6/2010 | Solar | |

FOREIGN PATENT DOCUMENTS

| | | |
|---|---|---|
| CN | 108417354 | * 8/2018 |
| DE | 20 2009 012960 | 12/2009 |

(Continued)

OTHER PUBLICATIONS

International Search Report issued in PCT/JP2020/013131, May 19, 2020, pp. 1-9.
(Continued)

*Primary Examiner* — Brian W Jennison
*Assistant Examiner* — Kristina J Babinski
(74) *Attorney, Agent, or Firm* — Jeffrey S. Melcher; Melcher Patent Law PLLC

(57) ABSTRACT

A flat, electrically and thermally conductive flat surface group is formed in the common connection region 32 of the secondary coil 13. The flat conductive surface group is directly and mechanically joined to the connecting surfaces of the first conductor plate 42, the second conductor plate 44, and the third conductor plate 46, respectively. The first conductor plate 42, the second conductor plate 44, and the third conductor plate 46 cover the entire common connection region 32. The annular first conductor plate 42 occupies the maximum area. The refrigerant can be circulated in the annular cavity provided inside the first conductor plate 42 to efficiently cool the whole.

4 Claims, 7 Drawing Sheets

(51) Int. Cl.
F28F 3/04 (2006.01)
H01F 38/08 (2006.01)

(56) References Cited

FOREIGN PATENT DOCUMENTS

| | | |
|---|---|---|
| JP | H05 82357 | 4/1993 |
| JP | 6-151211 | 5/1994 |
| JP | 2008-130657 | 6/2008 |
| JP | 2013/128663 | 9/2013 |
| JP | 2013-172066 | 9/2013 |
| JP | 2015-501539 | 1/2015 |
| JP | 2014 232822 | 12/2015 |
| WO | WO-2019131883 A1 * | 7/2019 ............. B23K 11/00 |

OTHER PUBLICATIONS

Written Opinion issued in PCT/JP2020/013131, May 19, 2020, Translation, p. 1.
European Search Report issued in corresponding EP 20 80 7647, Nov. 29, 2023, pp. 1-10.

* cited by examiner

WELDING TRANSFORMER

FIELD OF THE INVENTION

The present invention relates to a welding transformer.

BACKGROUND OF THE INVENTION

The inventors of this invention have developed a high-speed and high-quality resistance welding transformer and welding device. It controls the current of a primary coil by an inverter. Cooling water circulates in a secondary coil (Patent Document 1).

PRIOR ART DOCUMENT

[Patent Document]
[Patent Document 1] PCT/JP2012/066646

SUMMARY OF THE INVENTION

Problem to be Resolved by the Invention

In the welding transformer introduced in Patent Document 1, cooling water is circulated in the secondary coils. The secondary coils are obtained cutting copper plates. The secondary coils are electrically connected together and have refrigerant passages. Due to this structure, it is compact and exhibits the performance of being able to output a large current. Features such as the ability to connect the output terminals of welding transformers in parallel and use them have been highly evaluated. While maintaining this performance, it was required to further simplify the structure and reduce the manufacturing cost. In order to solve this problem, the present invention provides a welding transformer described below.

Means of Solving of the Problems

The following Configurations are structures for solving the above problems.

<Configuration 1>

A welding transformer, comprising:

a primary coil (12) and a secondary coil (13) are wound on a magnetic core (17), the secondary coil (13) includes a positive side coil (14) and a negative side coil (16) being connected in series, one terminal of the positive side coil (14) and one terminal of the negative side coil (16) are electrically connected to a first common electrode (22) together, the other terminal of the positive side coil (14) is electrically connected to one terminal of a first rectifier element (18), the other terminal of the negative side coil (16) is electrically connected to one terminal of a second rectifier element (20), the other terminal of the first rectifier element (18) and the other terminal of the second rectifier element (20) are electrically connected to a second common electrode (24) together, the first common electrode (22) and the second common electrode (24) are for electrically connection to a welding apparatus (28), the primary coil (12) is for receiving primary electric current from an inverter, which invert pulse that reverses polarity at a predetermined repetition rate, the primary coil (12) is divided into plural parts, and wound on the magnetic core (17), the plural positive side coils (14) and the plural negative side coils (16) are inserted between the plural parts, electrically and thermally conductive flat surface (30a) (30b) (30c) is formed on each terminal of all positive coils (14) and all negative coils (16), all the conductive flat surfaces are arranged in a common connection region (32) with a minute interval (34), the conductive flat surfaces (30a) being formed on one terminal of the positive coils (14) and one terminal of the negative coils (16) are a first conductive surfaces, the conductive flat surfaces (30b) being formed on the other terminal of the positive coils (14) are a second conductive surfaces, the conductive flat surfaces (30c) being formed on the other terminal of the negative coils (16) are a third conductive surfaces, the first conductive surfaces are directly and mechanically connected to the connection surface of a first conductor plate (42), the second conductive surfaces are directly and mechanically connected to the connection surface of the second conductor plate (44), the third conductive surfaces are directly and mechanically connected to the connection surface of the third conductor plate (46), the connection surface of the first conductor plate (42), the connection surface of the second conductor plate (44) and the connection surface of the third conductor plate (46) cover the whole common connection region (32), and the area of the connection surface of the first conductor plate (42) is the largest, a cavity (48) for flowing a cooling medium is provided inside the first conductor plate (42), the second conductor plates (44) are contacted to the one terminal of the first rectifier element (18) for electrically and thermally connection, and the third conductive plates (46) are contacted to the one terminal of the second rectifier element (20) for electrically and thermally connection.

<Configuration 2>

The welding transformer according to the configuration 1, wherein the first conductor plate includes an annular portion that covers and contacts a peripheral portion of the common connection region, and a cavity (48) for circulating the cooling medium is provided inside the annular portion (50).

<Configuration 3>

The welding transformer according to the configuration 2, wherein a connection surface of the second conductor (44) and a connection surface of the third conductor (46) are placed in a region surrounded by annular portion (50) of the first conductor plate (42).

<Configuration 4> wherein the connection surface of the first conductor plates (42) is formed with an uneven surface (56) include convex portions (52) and concave portions (54), that surfaces is in close contact with the first conductive surfaces on the common connection region (32).

<Configuration 5> wherein the connection surface of the second conductor plates (44) and the third conductor plates (46) is formed with an uneven surface (56) include convex portions (52) and concave portions (54), that surfaces is in close contact with the second conductive surfaces and the third conductive surfaces on the common connection region (32).

<Configuration 6>

The welding transformer according to the configuration 2, Wherein the second conductor plate (44) and the third conductor plate (46) are provided with a cavity (50) for circulating the cooling medium inside the second conductor plate (44) and the third conductor plate (46).

Effect of this Invention

A flat, electrically and thermally conductive flat surface group is formed in the common connection region 32 of the secondary coil 13. The conductive surface group is directly and mechanically connected to the connecting surfaces of the first conductor plate 42, the second conductor plate 44, and the third conductor plate 46, respectively. The first conductor plate 42, the second conductor plate 44, and the third conductor plate 46 cover the entire common connection region 32.

Refrigerant can be circulated in the cavity of the first conductor plate 42 to efficiently cool the whole. Furthermore, the structure is simplified and the mechanical strength is high. When the annular portion 50 is provided on the first conductor plate 42, the refrigerant can be circulated in the annular cavity provided inside, and the whole can be efficiently cooled.

If the second conductor plate 44 and the third conductor plate 46 are surrounded by the annular portion 50 of the first conductor plate 42, these can be efficiently cooled. When the conductive flat surface group and the conductor plate are joined via the uneven surface 56, the area for heat transfer is wide and the cooling performance is improved. Positioning can be performed with high accuracy by using the uneven surface 56, and the mechanical strength is increased.

DESCRIPTION OF THE EMBODIMENT

Hereinafter, embodiments of the present invention will be described in detail for each example.

Embodiment 1

Figure 1:
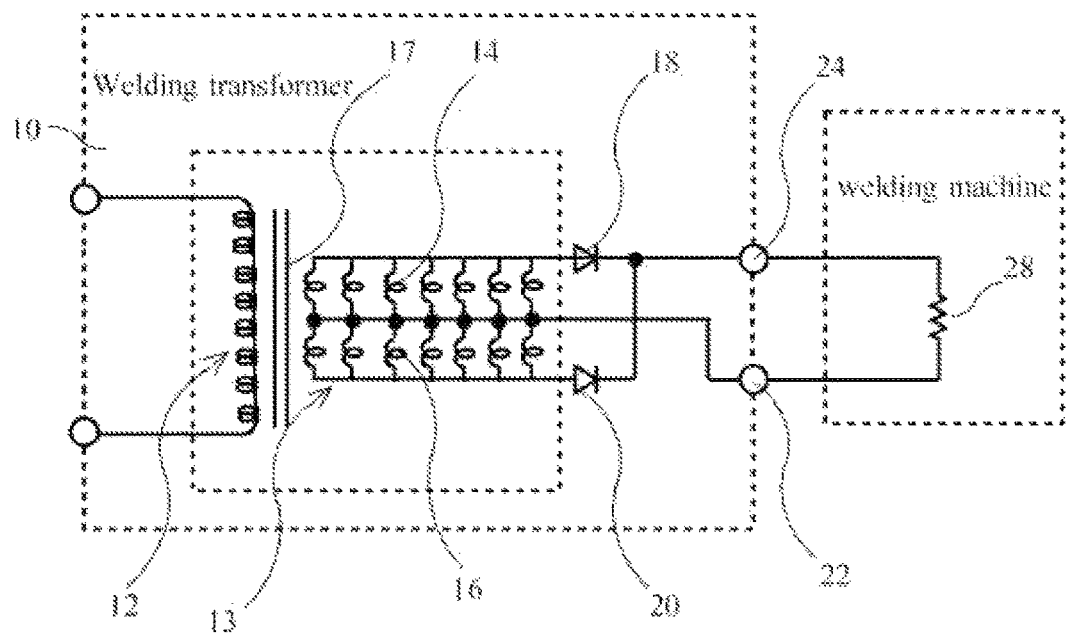
FIG. 1 is an equivalent circuit of a welding transformer 10.

FIG. 1 is an equivalent circuit of the welding transformer 10. The welding transformer 10 is a device for supplying a welding current to the welding machine 28. The welding transformer 10 incorporates a primary coil 12, a secondary coil 13, a first rectifying element 18, and a second rectifying element 20.

The primary coil 12 and the secondary coil 13 of the welding transformer 10 are wound on a magnetic core 17. The secondary coil 13 is a coil in which the positive coil 14 and the negative coil 16 are connected in series. A plurality of sets (7 sets in this embodiment) of the secondary coils 13 are electrically connected together in parallel to the secondary side of the welding transformer 10.

One terminal of the positive coil 14 and one terminal of the negative coil 16 are electrically connected together to the first common electrode 22. One terminal of the first rectifying element 18 is electrically connected to the other terminal of the positive coil 14, and one terminal of the second rectifying element 20 is electrically connected to the other terminal of the negative coil 16. The other terminal of the first rectifying element 18 and the other terminal of the second rectifying element 20 are electrically connected together to the second common electrode 24.

The first common electrode 22 and the second common electrode 24 are electrically connected together to the welding machine 28. A pulse-shaped primary current that inverts the polarity at a repetition frequency at a predetermined repetition rate by an inverter is supplied to the primary coil 12.

Figure 2:
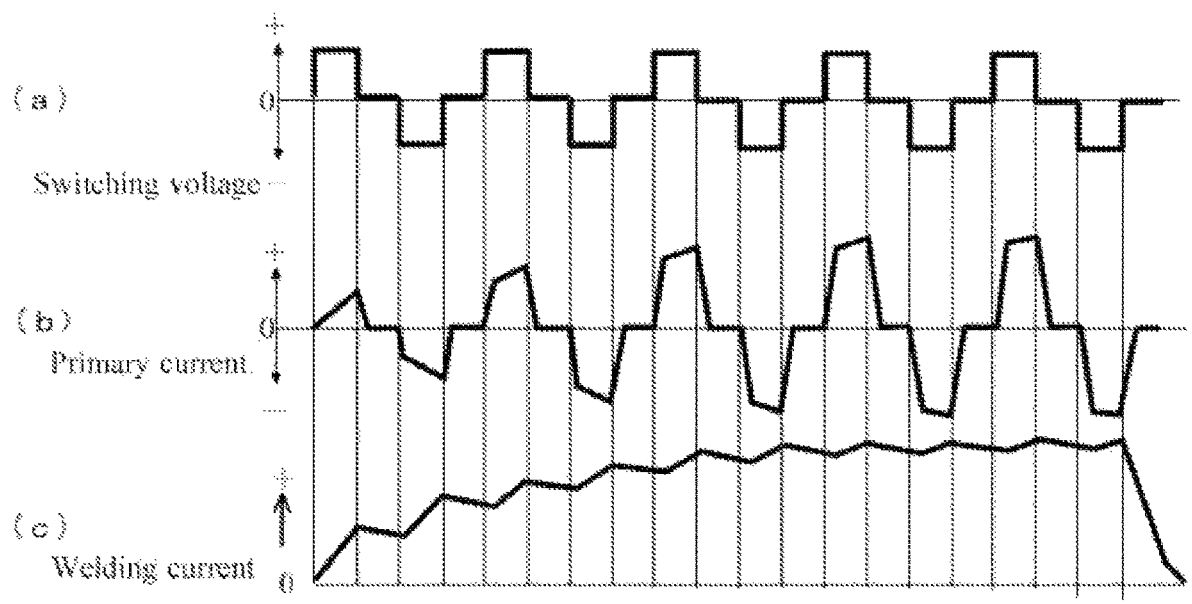
FIG. 2 is a current waveform diagram showing the relationship between the switching current and the welding current.

FIG. 2 is a current waveform diagram showing the relationship between the switching current and the welding current. This graph shows the change in welding current from the start of one spot welding to the end of welding. When the switching voltage shown in FIG. 2 (a) is supplied to the primary coil 12, the primary current shown in FIG. 2 (b) flows through the primary coil 12. This current is full-wave rectified on the secondary side, and the welding electric current shown in FIG. 2 (c) is output from the welding transformer 10 and supplied to the welding machine 28. (Overall structure)

Figure 3:
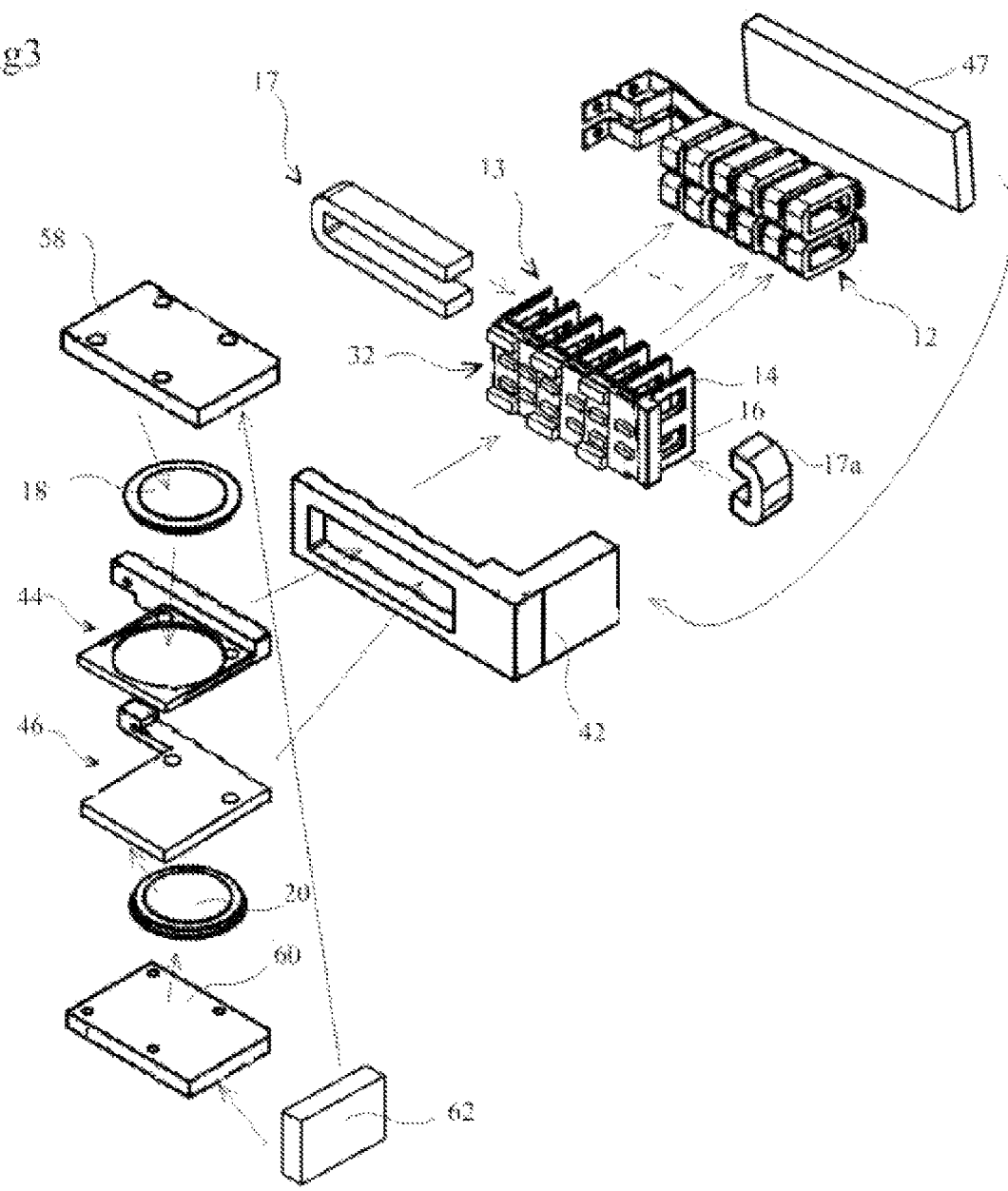
FIG. 3 is an exploded perspective view of the welding transformer 10 of the present invention.

FIG. 3 is an exploded perspective view of the welding transformer 10 of the present invention. The primary coil 12 is divided and wound into a plurality of parts and wound on a magnetic core 17. The structure of the primary coil 12 is the same as that introduced in Patent Document 1. The secondary coil 13 is sandwiched between the gaps of the splitty wound primary coil 12. This structure is also the same as that introduced in Patent Document 1. A magnetic core 17 is inserted into the central portion of the primary coil 12 and the secondary coil 13. The magnetic core 17a is connected to the end of the magnetic core 17 in order to form a magnetic path in a loop shape.

The first conductor plate 42 is connected to the secondary coil 13. The first conductor plate 42 is for electrically connecting the first common electrode 22 and the secondary coil 13 described in FIG. The second conductor plate 44 and the third conductor plate 46 are inserted into holes provided in the first conductor plate 42 with an insulating sheet (not shown) sandwiched between them, and are connected to the secondary coil 13.

An insulating sheet (not shown) is sandwiched between the first conductor plate 42, the second conductor plate 44, and the third conductor plate 46 in order to electrically separate them from each other. The second conductor plate 44 is for electrically connecting the secondary coil 13 and the first rectifying element 18.

The third conductor plate 46 is for electrically connecting the secondary coil 13 and the second rectifying element 20. The fourth conductor plate 47 and the first conductor plate 42 are connected in a U shape and surround the primary coil 12 and the secondary coil 13.

The first rectifying element 18 is sandwiched between the second conductor plate 44 and the first electrode plate 58. The second rectifying element 20 is sandwiched between the third conductor plate 46 and the second electrode plate 60. The first electrode plate 58 and the second electrode plate 60 are connected by a connecting plate 62. The connecting plate 62 is for electrically connecting the first rectifying element 18 and the second rectifying element 20 to the second common electrode 24 described in FIG.

The secondary coil 13, the first conductor plate 42, the second conductor plate 44, the third conductor plate 46, the fourth conductor plate 47, the first electrode plate 58, the second electrode plate 60, and the connecting plate 62 are Both can be made by cutting a copper plate.

(Structure of Secondary Coil)

Figure 4:
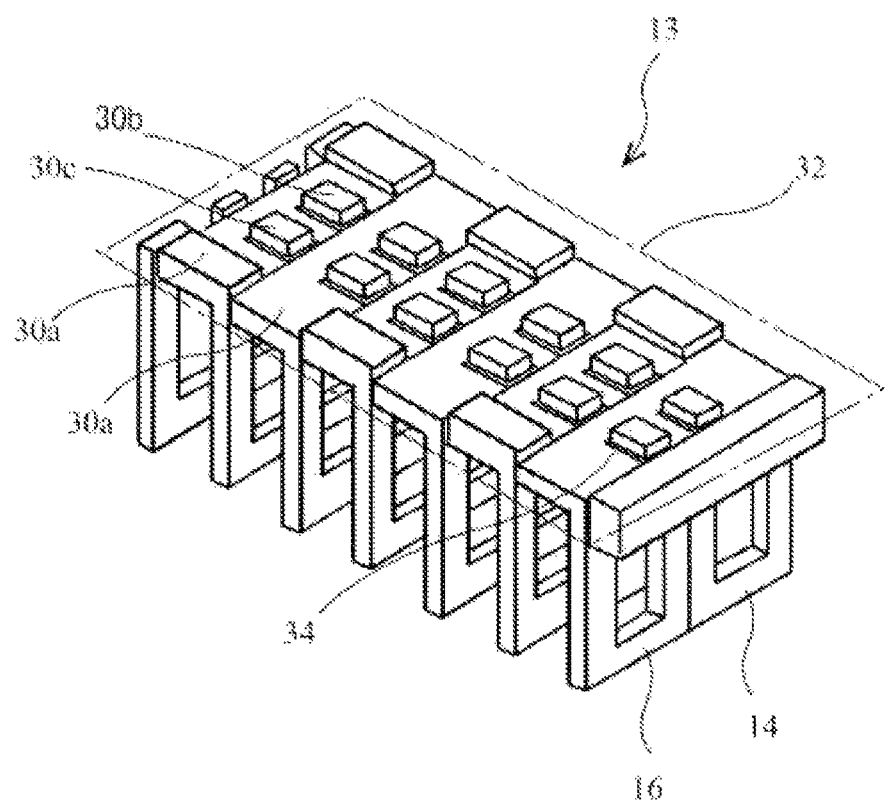
FIG. 4 is a perspective view of a secondary coil 13.

FIG. 4 is a perspective view of the secondary coil 13. FIG. 5 is a perspective view showing a unit in which a pair of positive side coils 14 and a negative side coil 16 are integrated, and their conduction surfaces 30a, 30b, and 30c. The positive side coil 14 and the negative side coil 16 constituting the secondary coil 13 can be manufactured by, for example, combining parts obtained by cutting copper into a shape as shown in the figure. One of the pair of one-turn coils arranged side by side is the positive coil 14, and the other is the negative coil 16. Each unit is mechanically connected by brazing or welding.

(Conduction Surface)

One terminal of the positive coil 14 and one terminal of the negative coil 16 are continuously integrated through a portion provided with a conductive flat surface 30a. The conductive flat surface 30b at the other terminal of the positive coil 14 projects from the central portion of the conductive flat surface 30a. The conductive surface 30c at the other terminal of the negative coil 16 also protrudes from the central portion of the conductive flat surface 30a.

As shown in FIG. 4, there are those in which the conductive surface 30a has no unevenness as a whole and those in which both ends are one step higher than the central portion. In the embodiment of FIG. 4, three sets of each of the two types of units (shown in FIG. 5A and FIG. 5B) and one set of the pair of positive coils 14 and the negative coil 16 at the end are combined and integrated.

Figure 5A:
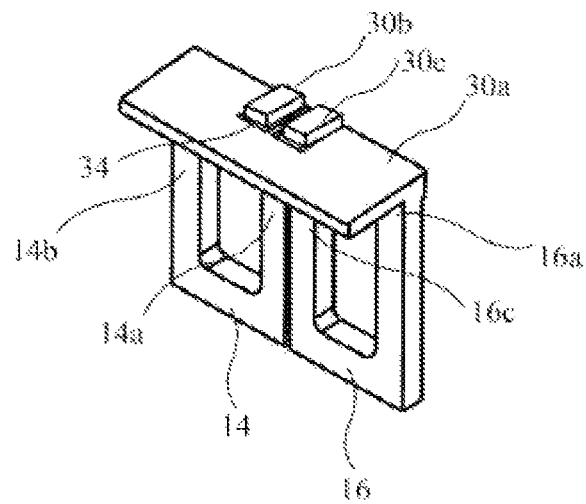
FIG. 5A and FIG. 5B is a perspective view of a unit in which integrate a pair of positive side coils 14 and negative side coils 16.
Figure 5B:
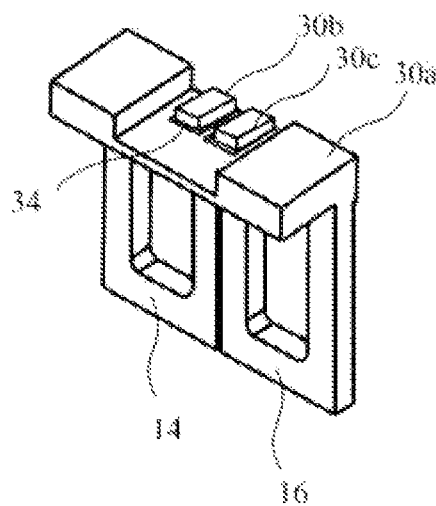

In any of the units shown in FIG. 5A and FIG. 5B, one terminal portion 14a and 16a (FIG. 5A) of the positive coil 14 and the negative coil 16 are connected to the conductor surface 30a. The other terminal portion 14b (FIG. 5A) of the positive coil 14 is connected to the conductor surface 30b. The other terminal portion 14c (FIG. 5A) of the negative coil 16 is connected to the conductor surface 30c.

In the conduction surface 30a, high and low height portions are alternately arranged in the plane of the common connection region 32 shown in FIG. 4. The conductive surface 30b and the conductive surface 30c are arranged in a row at intervals. The surfaces of the conductive surface 30a, the conductive surface 30b, and the conductive surface 30c, which are in contact with the first conductor plate 42, the second conductor plate 44, and the third conductor plate 46, are flat and sufficiently wide to ensure electrical and thermal conduction. Conduction can be ensured.

Figure 5C:
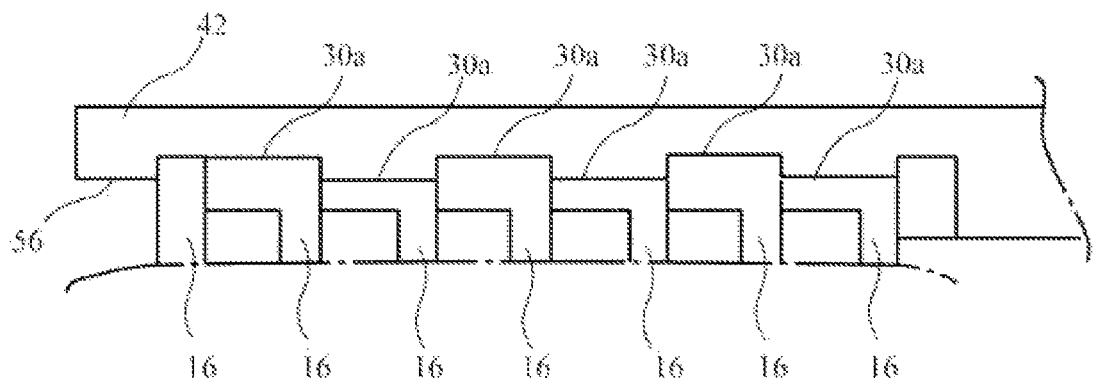
FIG. 5C is a partial side view showing a joined state of a conductor surface 30a and a first conductor plate 42.
Figure 6:
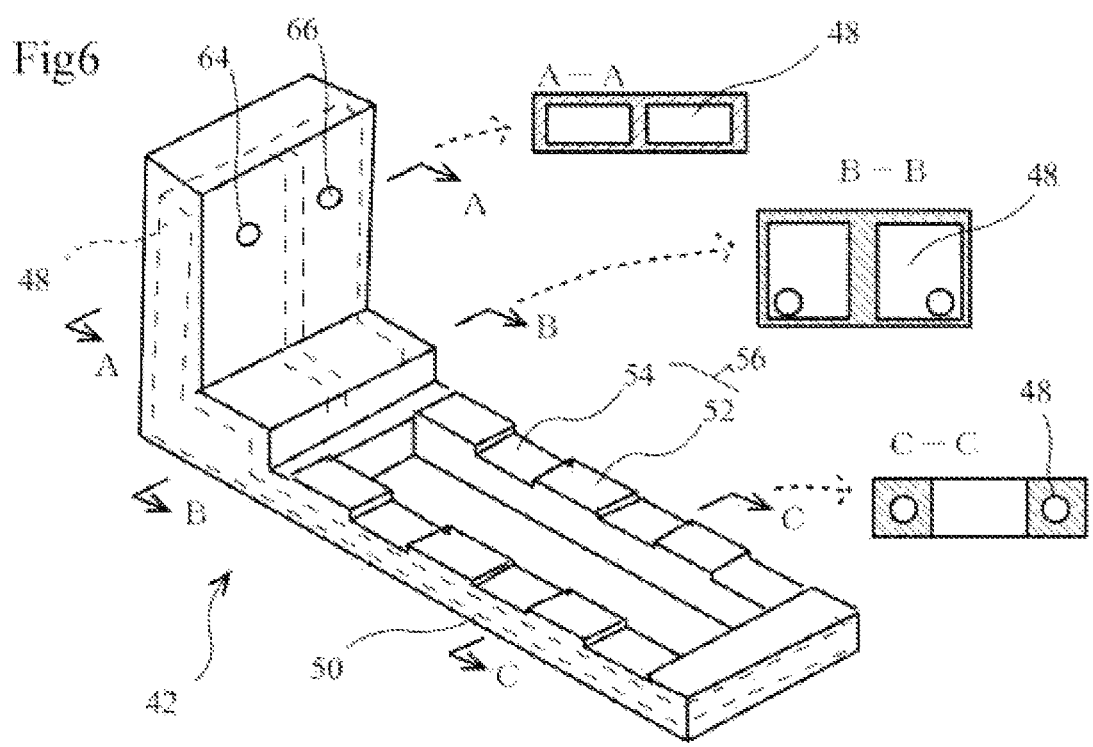
FIG. 6 is a perspective view of a first conductor plate 42.

FIG. 5C is a partial side view showing a joint state between the conductor surface 30a and the first conductor plate 42 as viewed from the side of the negative coil 16. In this way, the conductor surfaces 30a having different heights are arranged alternately, and the uneven surfaces 56 of the first conductor plate 42 described in FIG. 6 are in close contact with them without any gaps. The side surface on which the positive coils 14 on the opposite side are lined up has the same structure. Since the first conductor plate 42, the positive coil 14 and the negative coil 16 are in contact with each other over a wide area, a high cooling effect can be obtained.

The group of conductive surfaces 30a formed at one terminal of all the positive coils 14 and one terminal of all the negative coils 16 is called a first conductive surface group. The group of conductive surfaces 30b formed at the other terminal of all the positive coils 14 is called a second conductive surface group. The group of conductive surfaces 30c formed at the other terminal of all the negative coils 16 is called a third conductive surface group.

The first conductive surface group is mechanically directly and mechanically joined to the connecting surface of the first conductor plate 42. The second conductive surface group is mechanically directly and mechanically joined to the connecting surface of the second conductor plate 44. The third conductive surface group is directly mechanically joined to the connecting surface of the third conductor plate 46.

A gap 34 for electrical insulation is provided so that the conductive surface 30a, the conductive surface 30b, and the conductive surface 30c are electrically insulated from each other, and for example, an insulating sheet (not shown) is sandwiched therein. The structure of the unit shown in FIG. 5 can be freely deformed so as to have the same function.

(Common Connection Area)

Conductive surfaces 30a are arranged in a ring shape in the common connection area 32 so as to surround the entire surface of the common connection area 32. Further, the conductive surface 30b and the conductive surface 30c are arranged in a row at a place surrounded by the conductive surface 30a, respectively.

(A First Conductor Plate)

FIG. 6 is a perspective view of the first conductor plate 42. The first conductor plate 42 is entirely composed of an L-shaped copper plate. An uneven surface 56 in which convex portions 52 and concave portions 54 are alternately provided is formed on the connecting surface of the annular portion 50. As described in FIG. 5C, the uneven surface 56 is formed so as to be in close contact with all the conductive surfaces 30a and the upper surface and the side surface thereof.

As a result, the first conductor plate 42 is electrically and mechanically connected to the conduction surface 30a provided at one terminal of all the positive coil 14 and the negative coil 16. When the uneven surface 56 is brought into close contact with the upper surface and the side surface of the conductive surface 30a, the surface area for heat transfer can be increased as compared with the case where the entire surface is in contact with the flat surface, so that the cooling efficiency is improved. Mechanical strength also increases. Further, if the uneven surface 56 is provided, the first conductor plate 42 can be accurately positioned with respect to the secondary coil 13.

Figure 10:
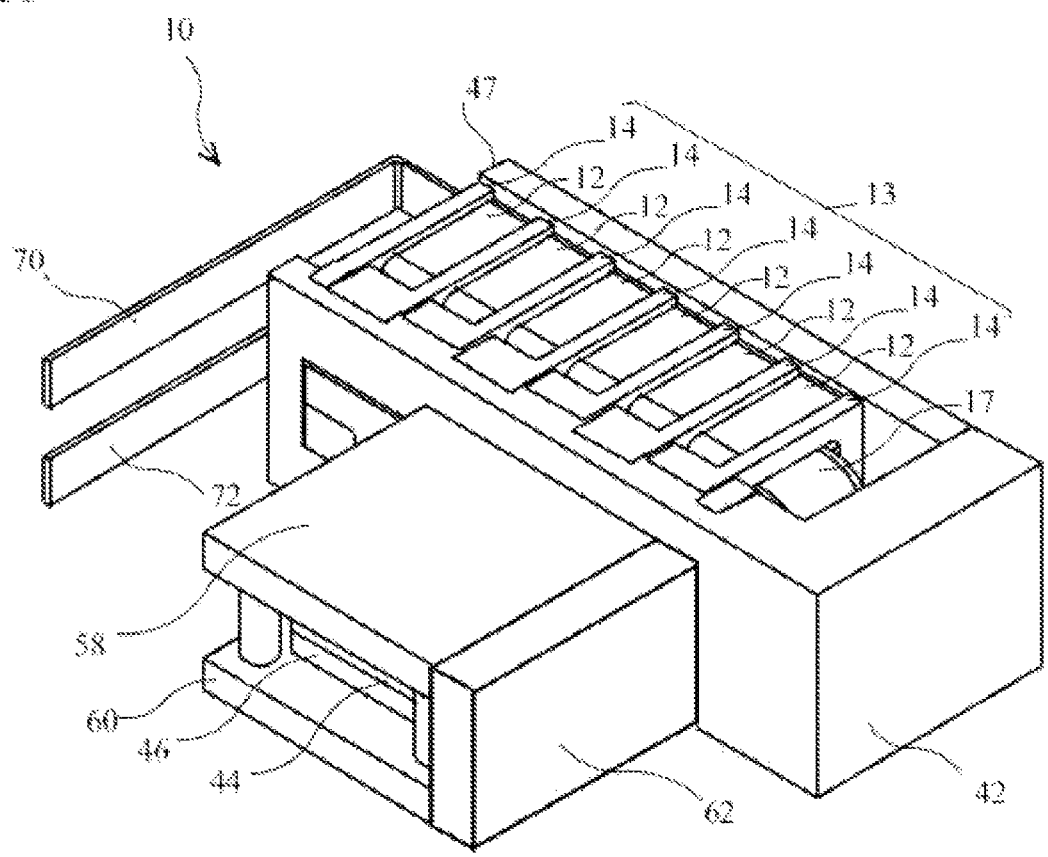
FIG. 10 is an external perspective view of a welding transformer 10 in which a main part is completed.

In this embodiment, a cavity through which the cooling medium flows can be provided inside the fourth conductor plate 47 shown in FIGS. 3 and 10. The fourth conductor plate 47 is arranged in noncontact with the primary coil 12 and the secondary coil 13 or via an insulator. The fourth conductor plate 47 has a function of indirectly cooling the primary coil 12 and the secondary coil 13.

The annular portion 50 covers and contacts the peripheral portion of the surface of the common connection region 32. Since the cavity for flowing a cooling medium 48 having a wide cross-sectional area can be formed in the first conductor plate 42, a large amount of cooling medium such as cooling water can be circulated quickly. Therefore, the annular portion 50 can efficiently cool the secondary coil 13. The shape, structure, and path of the cavity 48 can be freely selected in addition to this embodiment.

The electrically and thermal conductive surface is a connecting surface on which a sufficient current necessary for the welding transformer 10 to operate normally can flow. The electrically and thermal conductive surface has a sufficiently wide surface for heat transfer. For example, the first conductive surface group is mechanically connected to the connection surface of the first conductor plate 42 by, for example, welding or brazing.

(Second Conductor Plate)

Figure 7:
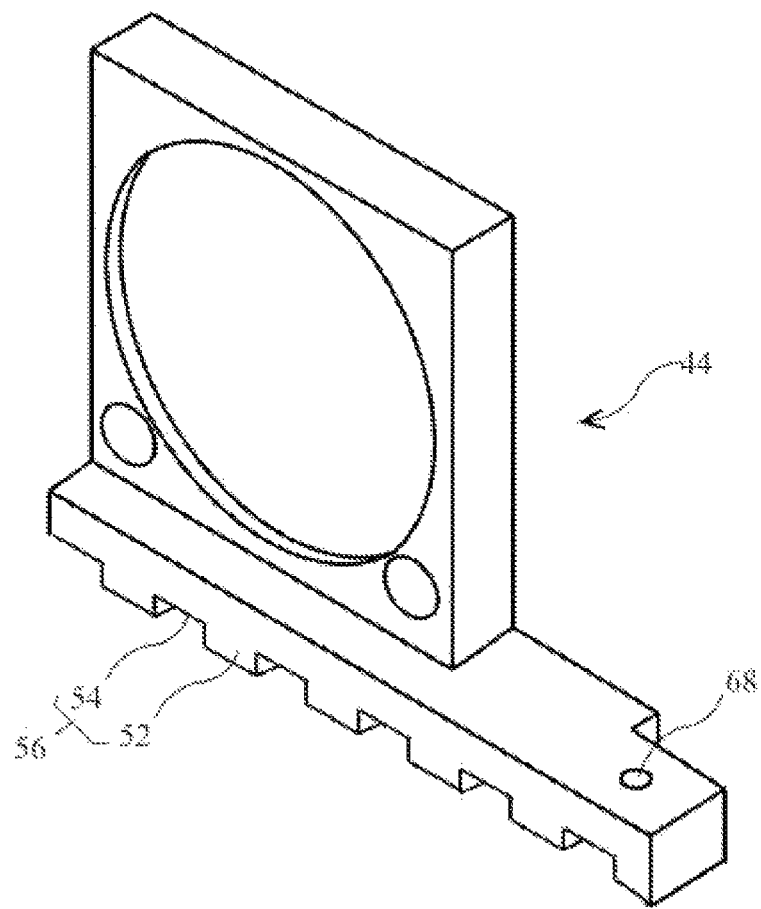
FIG. 7 is a perspective view of a second conductor plate 44.

FIG. 7 is a perspective view of the second conductor plate 44. An uneven surface 56 in which convex portions 52 and concave portions 54 are alternately arranged is formed in a portion of the second conductor plate 44 that is in close contact with the secondary coil 13. The uneven surface 56 is in close contact with the upper surface and the side surface of the conductive surfaces 30b arranged in a row shown in FIG. 4 and is electrically and mechanically connected.

In this way, the uneven surface 56 and the conductive surface 30b can be connected via a sufficiently large area. Further, by providing the uneven surface 56, the second conductor plate 44 can be positioned with high accuracy and the connection work can be performed. The second conductor plate 44 is also provided with a cavity 48 (not shown) for circulating the cooling medium inside, and the cooling medium is supplied from the introduction port 68, which is not shown on the opposite side. It can be discharged from the outlet port 66 and cooled.

(Third Conductor Plate)

Figure 8:
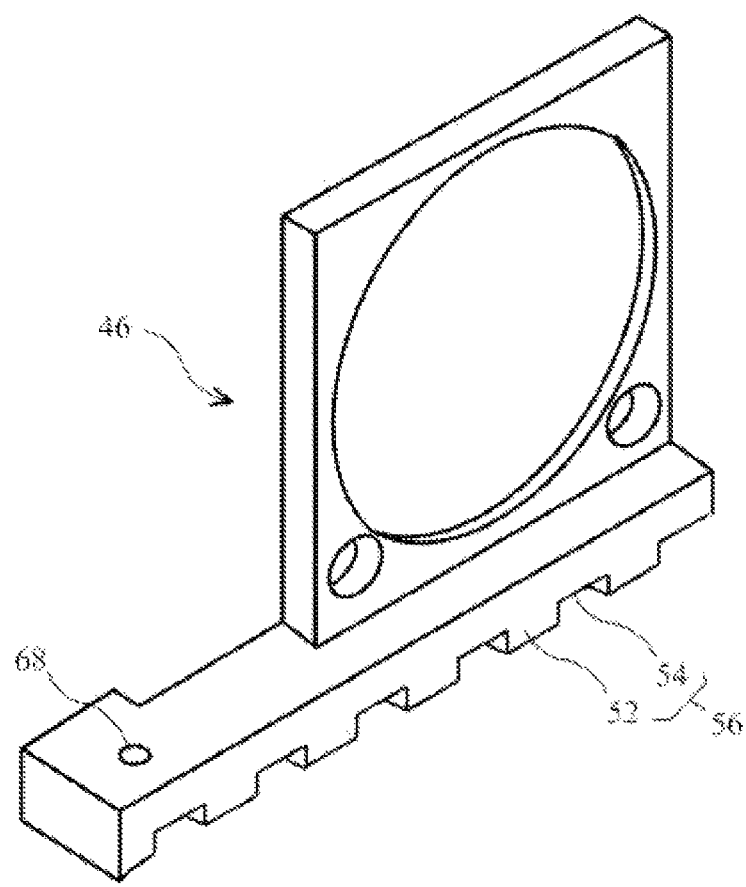
FIG. 8 is a perspective view of a third conductor plate 46.

FIG. 8 is a perspective view of the third conductor plate 46. An uneven surface 56 in which convex portions 52 and concave portions 54 are alternately arranged is also formed in a portion of the third conductor plate 46 that is in close contact with the secondary coil 13. The uneven surface 56 is in close contact with the upper surface and the side surface of the conductive surfaces 30c arranged in a row shown in FIG. 4 and is electrically and mechanically connected. The effect of the uneven surface 56 is the same as that of the second conductor plate 44. The structure capable of cooling is the same as that of the second conductor plate 44.

Figure 9:
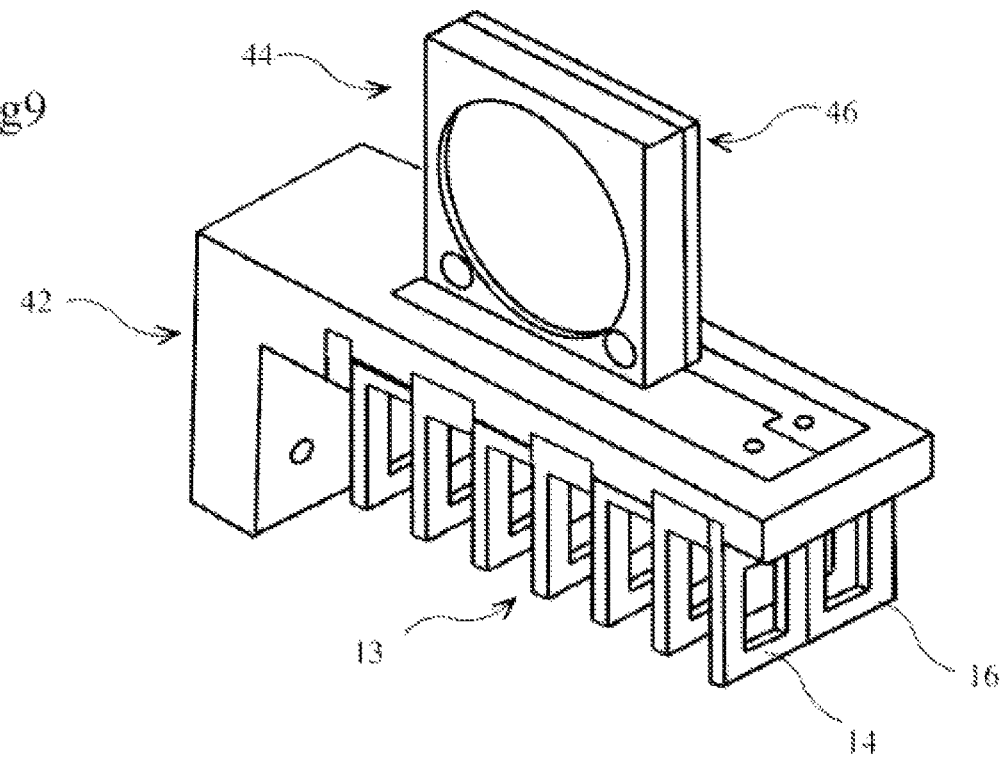
FIG. 9 is a perspective view showing a state in which a first conductor plate 42, a second conductor plate 44, and a third conductor plate 46 are connected to a secondary coil 13.

The connecting surface of the second conductor plate 44 and the third conductor plate 46 is placed in a region surrounded by the annular portion 50 of the first conductor plate 42. The first conductor plate 42, the second conductor plate 44, and the third conductor plate 46 cover the entire common connection region 32, and the first conductor plate 42 occupies the maximum area. This ensures high cooling capacity. (assembly) FIG. 9 shows a state in which the first conductor plate 42 is connected to the secondary coil 13 and the second conductor plate 44 and the third conductor plate 46 are fitted into the first conductor plate 42. As described above, an insulating sheet (not shown) is sandwiched between the second conductor plate 44 and the third conductor plate 46. Further, an insulating sheet is also sandwiched between the surfaces of the second conductor plate 44 and the third conductor plate 46 and the first conductor plate 42 in contact with each other.

(Overall Appearance)

FIG. 10 is an external perspective view of a welding transformer in which the main part is completed.

The secondary coil 13 is sandwiched between the gaps of the separately wound primary coil 12. A magnetic core 17 is inserted in the central portion of the primary coil 12 and the secondary coil 13.

The first rectifying element 18 (hidden in this figure) is fitted in the second conductor plate 44. The second rectifying element 18 is sandwiched between the second conductor plate 44 and the first electrode plate 58. A second rectifying element 20 (hidden in this figure) is fitted in the third conductor plate 46. The second rectifying element 20 is sandwiched between the third conductor plate 46 and the second electrode plate 60.

The terminal plate 70 and the terminal plate 72 are input terminals of the primary coil 12. The first conductor plate 42 is connected to the first common electrode 22. The connecting plate 62 is connected to the second common electrode 24. The welding transformer 10 operates in this state. It is also possible to use a plurality of welding transformers 10 connected in parallel.

As explained above, since the first conductor plate 42 has a very simple structure, a large cavity for flowing a cooling medium can be provided inside. Since the cooling medium can flow so as to circulate in the annular portion 50, a smooth loop-like flow of the cooling medium can be realized. Since a large amount of refrigerant can be circulated in a short time, high cooling efficiency can be realized.

Since the first conductor plate 42, the second conductor plate 44, and the third conductor plate 46 are in direct contact with the secondary coil 13 over a wide area, the heat transfer efficiency is good. The connection part has little electrical resistance loss.

REFERENCE SIGNS LIST

10 A welding transformer
12 primary coils
13 secondary coils
14 a positive side coil
16 a negative side coil
17 a magnetic core
18 a first rectifier element
20 a second rectifier element
22 a first common electrode
24 a second common electrode
28 welding devices
30a conductive flat surface
30b conductive flat surface
30c conductive flat surface
32a common connection region
34 Spacing for electrical insulation
42 a first conductor plate
44 a second conductor plate
46 a third conductor plate
47 a fourth conductor plate
48 a cavity for flowing a cooling medium
50 an annular portion
52 convex portions
54 concave portions
56 an uneven surface
58 first electrode plate
60 second electrode plate
62 connecting plate 64 introduction port
66 outlet port
68 introduction port
70 terminal plate
72 terminal plate

The invention claimed is:

1. A welding transformer, comprising:
a primary coil and a secondary coil are wound on a magnetic core, the secondary coil includes a positive side coil and a negative side coil being connected in series,
one terminal of the positive side coil and one terminal of the negative side coil are electrically connected to a first common electrode together,
the other terminal of the positive side coil is electrically connected to one terminal of a first rectifier element,
the other terminal of the negative side coil is electrically connected to one terminal of a second rectifier element,
the other terminal of the first rectifier element and the other terminal of the second rectifier element are electrically connected to a second common electrode together,
the first common electrode and the second common electrode are for electrically connection to a welding apparatus,
the primary coil is for receiving primary electric current from an inverter, which invert pulse that reverses polarity at a predetermined repetition rate,
the primary coil is divided into plural parts, and wound on the magnetic core, the plural positive side coils and the plural negative side coils are inserted between the plural parts,
electrically and thermally conductive flat surface is formed on each terminal of all positive coils and all negative coils,
all the conductive flat surfaces are arranged in a common connection region with a minute interval,
the conductive flat surfaces being formed on one terminal of the positive coils and one terminal of the negative coils are the first conductive surfaces,
the conductive flat surfaces being formed on the other terminal of the positive coils are the second conductive surfaces,
the conductive flat surfaces being formed on the other terminal of the negative coils are the third conductive surfaces,
the first conductive surfaces are directly and mechanically connected to the connection surface of the first conductor plate,
the second conductive surfaces are directly and mechanically connected to the connection surface of the second conductor plate,
the third conductive surfaces are directly and mechanically connected to the connection surface of the third conductor plate,
the first conductive surfaces, the second conductive surfaces, and the third conductive surfaces are each flat for ensuring electrical and thermal conduction,
the second conductor plate is contacted to the one terminal of the first rectifier element for electrical and thermal connection,
the third conductor plate is contacted to the one terminal of the second rectifier element for electrical and thermal connection,
wherein,
the connection surface of the first conductor plate, the connection surface of the second conductor plate and the connection surface of the third conductor plate cover the whole common connection region, and the area of the connection surface of the first conductor plate is the largest,
a cavity for flowing a cooling medium is provided inside the first conductor plate,
the one terminal of the positive coil and the one terminal of the negative coil are continuously integrated through a portion provided with a conductive flat surface,
the other terminal of the positive side coil protrudes from the central portion of the integrated conductive flat surface,
the other terminal of the negative side coil protrudes from the central portion of the integrated conductive flat surface,
the first unit has no unevenness plane on the integrated conductive flat surface,
the second unit has one step higher plane both ends on the integrated conductive flat surface,
the first unit and the second unit are alternately arranged and form the uneven surface of the first conductive surfaces,
the first conductor plate includes an annular portion that covers and contacts a peripheral portion of the common connection region, and a cavity for circulating the cooling medium is provided inside the annular portion,
the first conductive surfaces are arranged in a ring shape on the common connection region to surround the entire surface of the common connection region, and
the connection surface of the first conductor plates is formed with the uneven surface include convex portions and concave portions, the connection surface is in close contact with the first conductive surfaces on the common connection region.

2. The welding transformer according to claim 1, wherein a connection surface of the second conductor and a connection surface of the third conductor are placed in a region surrounded by annular portion of the first conductor plate.

3. The welding transformer according to claim 1, wherein the connection surface of the second conductor plate is formed with an uneven surface including convex portions, and the connection surface of the second conductor is in close contact with the second conductive surfaces on the common connection region, and
the connection surface of the third conductive plate is formed with an uneven surface including convex portions and concave portions, and the connection surface of the third conductive plate is in close contact with the third conductive surfaces on the common connection region.

4. The welding transformer according to claim 1, wherein the second conductor plate and the third conductor plate are provided with a cavity for circulating the cooling medium inside the second conductor plate and the third conductor plate.

* * * * *